United States Patent [19]

Idigkeit et al.

[11] Patent Number: 4,638,983

[45] Date of Patent: Jan. 27, 1987

[54] APPARATUS FOR RESILIENTLY MOUNTING A VIBRATING BODY

[75] Inventors: Werner Idigkeit, Weinheim; Klaus Kurr, Weinheim-Hohensachsen; Gerd-Heinz Ticks, Wald-Michelbach, all of Fed. Rep. of Germany

[73] Assignee: Firma Carl Freudenberg, Weinheim, Fed. Rep. of Germany

[21] Appl. No.: 756,999

[22] Filed: Jul. 19, 1985

[30] Foreign Application Priority Data

Sep. 11, 1984 [DE] Fed. Rep. of Germany ....... 3433255

[51] Int. Cl.⁴ ........................ B60K 5/12; F16F 13/00; F16F 15/04
[52] U.S. Cl. ................................. 267/140.1; 180/300; 180/312; 248/550; 248/562; 244/17.27; 267/152
[58] Field of Search ............... 248/550, 562, 636, 659; 180/292, 293, 297, 300, 65.1, 902, 76, 312; 267/140.1, 63 R, 136, 140.2, 141, 141.1–141.7, 152, 8 R, 113, 118–129, 64.11–64.28, 35, 153; 188/378–380, 280, 299, 298; 364/424, 431.08; 244/17.27, 17.11

[56] References Cited

U.S. PATENT DOCUMENTS

| 2,535,080 | 12/1950 | Lee | 267/140.1 |
| 4,383,679 | 5/1983 | Kakimoto | 267/153 X |
| 4,415,148 | 11/1983 | Mair et al. | 267/122 |
| 4,505,461 | 3/1985 | Kakimoto | 267/140.1 |
| 4,535,976 | 8/1985 | Dan et al. | 267/153 X |

FOREIGN PATENT DOCUMENTS 2737985 3/1978 Fed. Rep. of Germany.
2947018 5/1981 Fed. Rep. of Germany ... 267/140.1

Primary Examiner—Douglas C. Butler
Attorney, Agent, or Firm—Felfe & Lynch

[57] ABSTRACT

An apparatus for resiliently mounting a vibrating body, has a mounting bracket and a pedestal interconnected through a resilient element to define a liquid-filled hollow space. A compensating baffle bounds at least 10% of the liquid-filled hollow space and is moved by a positioning element to compensate for pressure variations in the liquid caused by vibrations, of the body. The positioning element is actuated by a primary element which detects the vibrations of the body, through a freely programmable control unit.

15 Claims, 8 Drawing Figures $f_1 = 5Hz (200ms); a_1 = \pm 0,5mm$ $f_2 = 50Hz (20ms); a_2 = \pm 0,1mm$

APPARATUS FOR RESILIENTLY MOUNTING A VIBRATING BODY

BACKGROUND OF THE INVENTION

The invention relates to an apparatus for resiliently mounting a vibrating body.

A known apparatus for resiliently mounting a vibrating body has a mounting bracket and a pedestal for respective connection to the vibrating body and a structure on which the apparatus mounts it. The mounting bracket and pedestal are interconnected by a resilient element having a liquid-filled hollow space. A positioning element adjusts a compensating baffle associated with the liquid-filled hollow space to compensate for pressure variations in the liquid caused by the vibrations of the body relative to the structure on which the apparatus mounts it.

An apparatus of this type is described in German patent No. 27 37 985. It is intended for mounting an internal-combustion engine in a motor vehicle and has a liquid-passing line which communicates between the liquid-filled hollow or working space and a converter chamber which is bounded by the compensating baffle. Relative vibrations between the engine and vehicle, for example from the pistons of the engine, set the compensating baffle into synchronous motion to produce pulsating pressure vibrations in the working space. The object is to isolate high-frequency, second-order engine vibrations, but this is not fully accomplished because the pressure variations necessarily follow the variation-producing vibrations with a more-or-less pronounced phase displacement, for example depending on the rotational speed of the engine for piston-produced engine vibrations. Moreover, no provisions are made for other, non-second-order vibrations which may be due to the natural frequencies of additional devices resiliently attached to the engine or vehicle power train, for example.

SUMMARY OF THE INVENTION

The object of the invention is to improve an apparatus of the type outlined at the outset.

In accordance with the invention, this object is accomplished in that the compensating baffle bounds the working space itself and covers at least 10 percent of the boundary surface of the working space; that the positioning element is adapted to be actuated by a primary element which detects disturbing vibrations; and that the primary element and the positioning element are interconnected through a freely programmable control unit.

The design of the apparatus of the invention thus is based on the premise that in addition to a defined type of low-frequency vibrations a more or less nonspecific spectrum of disturbing high-frequency vibrations must also be absorbed as a rule. This is true particularly in the case of the engine mount of a motor vehicle.

Low-frequency vibrations are introduced into the engine mount of a motor vehicle especially when the latter travels over a rough road or as the engine is started. They must be rapidly damped if an excessive increase in amplitude and a considerable decrease in riding comfort are to be avoided.

High-frequency vibrations in the engine mount of a motor vehicle which range from 25 to 1000 Hz are a result of a lack of mechanical balance between the moving parts of the engine, which in practice cannot be perfectly balanced, and of the natural frequencies of additional devices attached to the engine, and of the drive unit itself. These vibrations have a relatively small amplitude and, in the form of throbbing vibrations, can be a real nuisance during the ride. They occur especially when there is a considerable load on the engine. It is therefore desirable to isolate such vibrations by compensation. However, in the design in accordance with the invention such conpensation is not rigidly tied to one or more input variables and operating conditions of the engine but is empirically established on the basis of one or more input variables and/or operating conditions, and the settings may differ widely according to the type of engine and vehicle.

The disturbing vibrations which actually occur can thus be neutralized in a unique and entirely novel manner, the basic adjustment being made routinely on the test stand and on the completely assembled vehicle. The compensatory response thus can be readily adapted to widely differing engines, vehicle types and rotative speeds, and optimum effectiveness under all conceivable operating conditions is assured at all times.

The control unit provided with the basic adjustment is an inflexible component which undergoes no modification when the apparatus of the invention is used in volume. Its operating reliability therefore is excellent and its volume production is extremely simple.

For the control of the positioning element of the compensating baffle, a control point with which specific disturbing vibrations can be associated in a particularly representative manner is continuously fed to the control unit. The use of the firing signal has proved particularly appropriate in this connection. In addition to the control point, further input variables such as gear engaged, throttle position, and underpressure in the intake manifold, that is, input variables which are apt to characterize the overall operating condition of the drive, may be fed to the control unit. There the control point and the other input variables are modified by phase shifting and/or frequency multiplication and/or amplitude multiplication in such a way that optimum compensation of the disturbing vibrations is achieved.

These are thus extremely well isolated.

BRIEF DESCRIPTION OF THE DRAWINGS

Preferred embodiments which illustrate but do not limit the apparatus of the invention will now be described in greater detail with reference to drawings in which.

DETAILED DESCRIPTION

Figure 2:
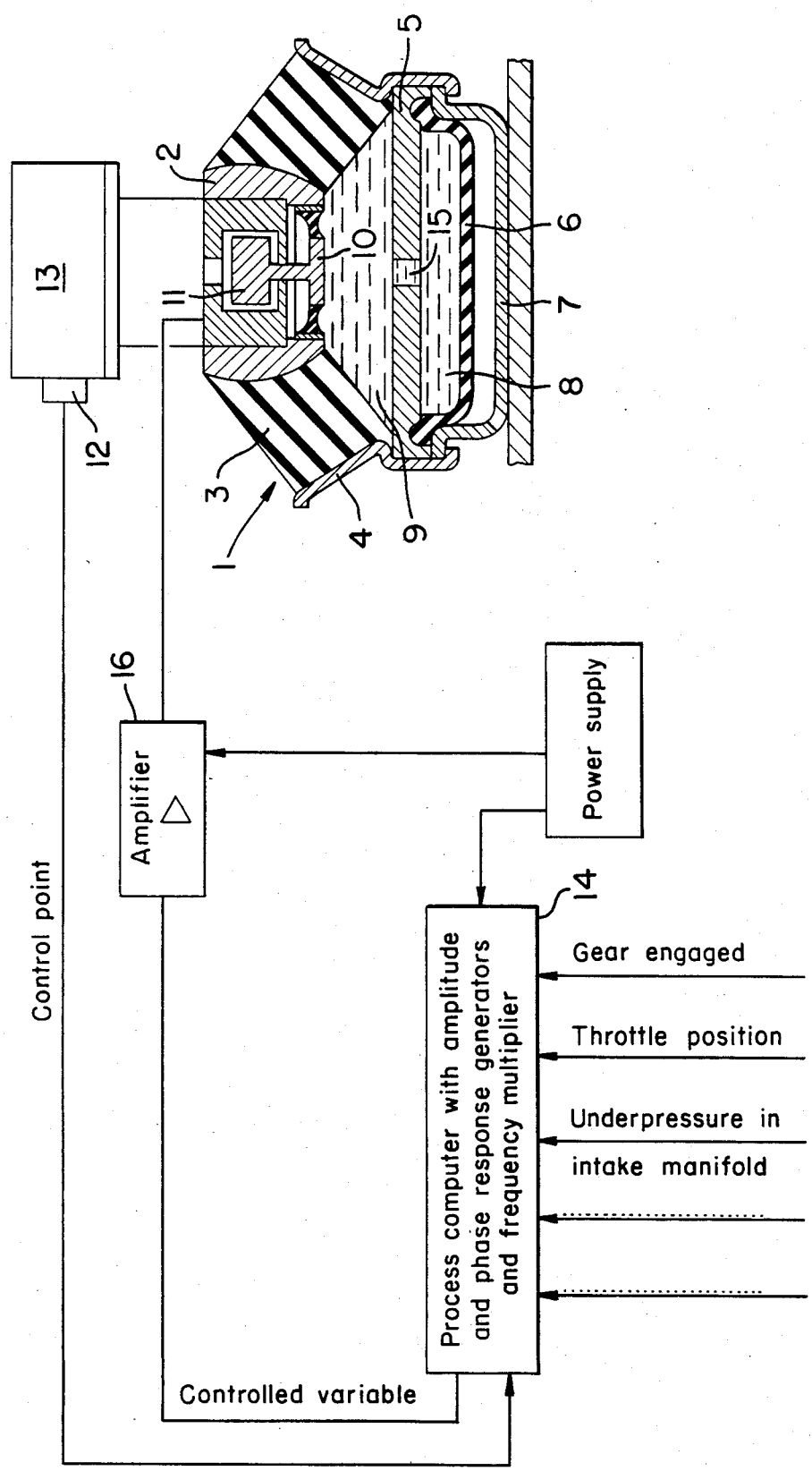
FIG. 2 is a sectional view of a mount.

Shown diagrammatically in FIG. 2 are a piston engine 13 and, attached thereto, a primary element 12, which preferably measures the speed of rotation of the engine. Such a primary element may be, for instance, an inductive impulse transmitter type M3050 made by Electro Corporation of Sarosota, Fla. In addition to the control point, the primary element feeds further input variables such as gear engaged, throttle position and underpressure in the intake manifold, etc., to the control unit 14. A Euromax microcomputer system made by Dr. Weiss GmbH of Schriesheim, West Germany is suitable for the control unit 14, for example. The software therefor results from consideration of the type of the engine 13 and vehicle, for example, in which the engine is used. All these quantities are processed in a process computer that is part of the control unit 14 on the basis of a specific program and brought into the proper phase relationship with the control point. In addition, the amplitude-frequency response and the frequency of the control point may be varied. The signal so processed is fed through a power amplifier 16 to the positioning element of the compensating baffle. The hydraulic engine mount 1 comprises a core 2 in which a positioning element 11 (an electric magnet coil) and a compensating baffle 10 are disposed. Through a rubber thrust element 3, the core 2 is adhesive-bonded to a pedestal or mounting ring 4. Permanently attached to the latter are mounting bracket or cover 7, a nozzle plate 5 and a closure bellows 6. The working space 9 disposed above the nozzle plate 5 is bounded by the rubber thrust element 3, the compensating baffle 10 and a rubber return spring 10a for the positioning element and compensating baffle and is filled with a fluid. An equalizing space 8, which is also filled with a fluid, is located between the nozzle plate 5 and the closure bellows 6 (a flexible, rolling-diaphragm wall). The working space 9 and the equalizing space 8 are interconnected through a hole-type nozzle 15.

The internal-combustion engine which is the source of the disturbing vibrations is rigidly mounted on the core 2 of the mount while the cover 7 is secured to the foundation (the chassis, or frame, of the vehicle).

The primary element 12 attached to the engine delivers an electrical signal which is in a fixed phase relationship with the disturbing vibrations of the engine, which are due to second-order inertia forces, that is to say, a downward motion, for example, of the engine will generate a positive electrical signal at the primary element 12. This signal is then processed in the control unit 14 on the basis of the speed of rotation and of the other input variables and transmitted to the positioning element 11 so that the compensating baffle is displaced in a direction exactly opposite to that of the motion of the engine, upwardly in this case, and the compression of the fluid due to the downward motion of the engine is fully compensated by the upward motion of the compensating baffle. All other disturbing vibrations at the engine are excited by secondorder forces and therefore are in precisely defined phase relationships with the latter that are a function of speed of rotation. These relationships are programmed in the control unit 14 and are brought into play according to the control point and the input variables that are present.

Tests have shown that the power required for control is very low and ranges from 15 to 25 watts. The reason why the power requirement is so low is that the compensating baffle 10 is located and acts exactly at the point at and in the direction in which the compressional waves produced in the working space upon the introduction of vibrations impinge on one another.

Figure 3:
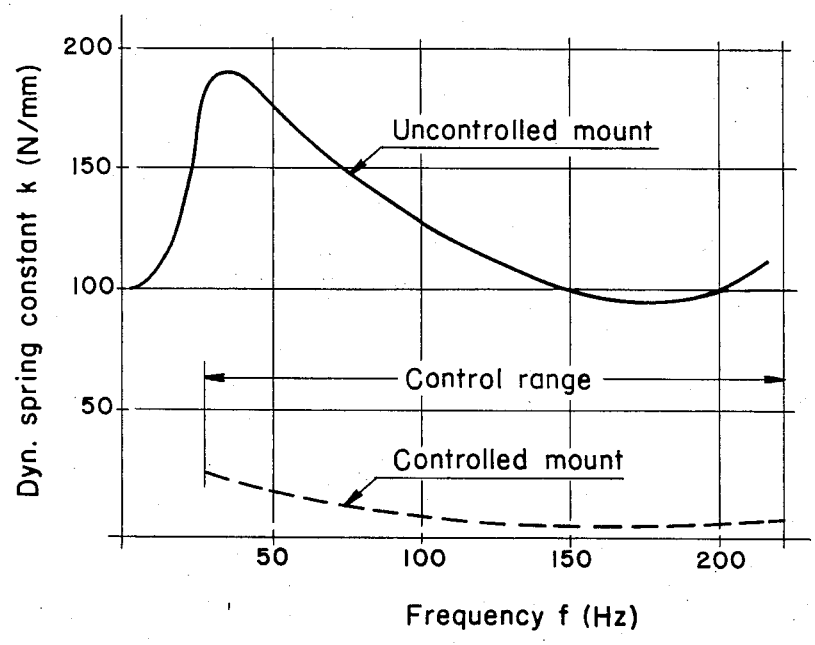
FIG. 3 plots dynamic spring constant against frequency.
Figure 4:
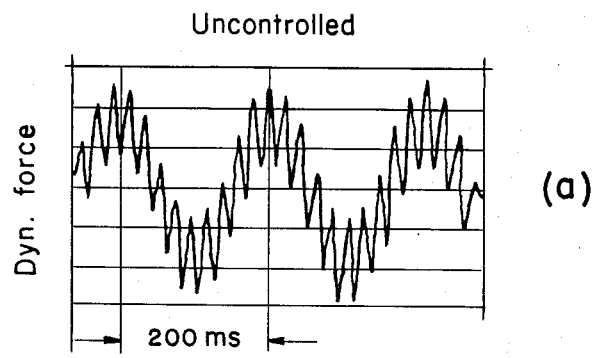
FIG. 4a plots uncontrolled dynamic force against time.
FIG. 4b plots controlled dynamic force against time.
Figure 4:
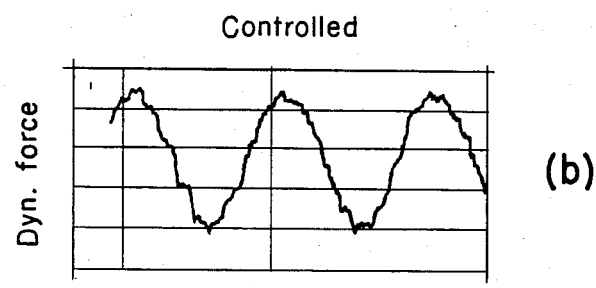

In FIG. 3, the dynamic spring constant is plotted against the frequency. The measurement is based on an engine mount with a static spring constant in the vertical direction of 100 N/mm. The uncontrolled engine mount exhibits as shown in FIG. 4a the typical increase of the spring constant in the lower frequency range of a hydraulically damped rubber engine mount. With the control unit cut in, the spring constant is considerably reduced as shown in FIG. 4b. The lower cut-off frequency of the control range may be set at about 25 Hz, which in the case of a four-cylinder engine corresponds to an idling speed of 750 rpm. That the control system is effective not only with pure sinusoidal vibrations but also with impressed vibrations is apparent from FIG. 4. In the case illustrated, the engine mount was excited on the core side to vibrations at two frequencies with different amplitudes ($f_1 = 5$ Hz, $a_1 = \pm 0.5$ mm, and $f_2 = 50$ Hz, $a_2 = \pm 0.1$ mm) and the reaction was measured at the cover 7 of the mount. In the uncontrolled case (FIG. 4a), the high-frequency vibration ($f_2 = 50$ Hz) penetrates the engine mount unhindered, because of its high spring constant, whereas in the controlled case (FIG. 4b) it is nearly compensated while at the same time the low-frequency vibration ($f_1 = 5$ Hz) is not impaired. This is extremely important as in that frequency range the hydraulic damping is to become effective.

The compensating baffle may be driven by an electric motor, in which case the use of an electric magnet coil will permit variation not only of the frequency but also of the amplitude.

The drive system then resembles a loudspeaker. Proven arrangements therefore can readily be utilized. In another advantageous embodiment, the drive has a return spring. This may result in lower manufacturing costs. The principle of operation is illustrated below in terms of a concrete example.

In the control unit, the control point and the other input variables are transformed, by phase shifting and/or frequency multiplication and/or amplitude magnification to the controlled variable so that optimum compensation of the disturbing vibrations is provided by the engine mounting apparatus.

The interaction between these parameters and the controlled variable will now be described in terms of an example.

Let us assume a motor vehicle with a four-cylinder in-line engine and the following typical disturbing vibrations:

(1) Unequalized second-order inertia forces over the entire speed range.
(2) Natural frequency of the gear case at 260 Hz, occurring at 2000 rpm in second gear on shifting.
(3) Natural frequency of the generator, which is elastically suspended from the engine, at 100 Hz.
(4) Third-order bending vibration of the complete drive unit with resonance at 225 Hz.

The vibrations referred to under (1) are compensated at the mounting apparatus in that the compensating baffle is displaced at the frequency of double the speed of rotation with proper amplitude and phase. This is elucidated by FIG. 1a, to 1c, respectively in which the amplitude ratio $a/a_o$ between the controlled variable and the control point, the phase angle $\phi$ between them, and the frequency ratio $f/f_o$ between these two quantities are plotted against the engine speed. "With proper amplitude and phase" in this case means that the phase angle between the control point and the controlled variable increases with the speed of rotation whereas the amplitude ratio decreases. The explanation for this is that as the speed of rotation, that is, the frequency of excitation, increases, the amplitudes occurring at the engine actually become smaller so that a smaller deflection of the compensating baffle is required. In the case of the phase shift, it is necessary to make allowance in the higher speed rang for the natural vibratory behavior of the compensating baffle, that is, here the controlled variable must be displaced in phase with respect to the control point to counteract the resonance-based phase lag of the compensating baffle and thus to reestablish synchronism between the compensating baffle and the control point.

With reference to (2), under very specific operating conditions the gear case is set into vibration of a magnitude several times greater than that of the disturbing vibrations referred to under (1). In this case, the control unit effects a frequency multiplication of $260 \times 60/2000 = 7.8$ (FIG. 1c) and a phase shift of about 180 degrees over the specified speed range (range I, for example, 1800 to 2200 rpm), beginning at the lower speed limit with a value previously determined during the adjustment of the vehicle.

However, the amplitude of the controlled variable, and hence the excursion of the compensating baffle, is increased in this speed range in order to compensate the disturbing vibration involved effectively at the engine mounting apparatus and prevent its transmission to the chassis of the motor vehicle. Once the upper speed limit of this range I has been reached, the control unit changes over and returns to the state according to (1).

Figure 1:
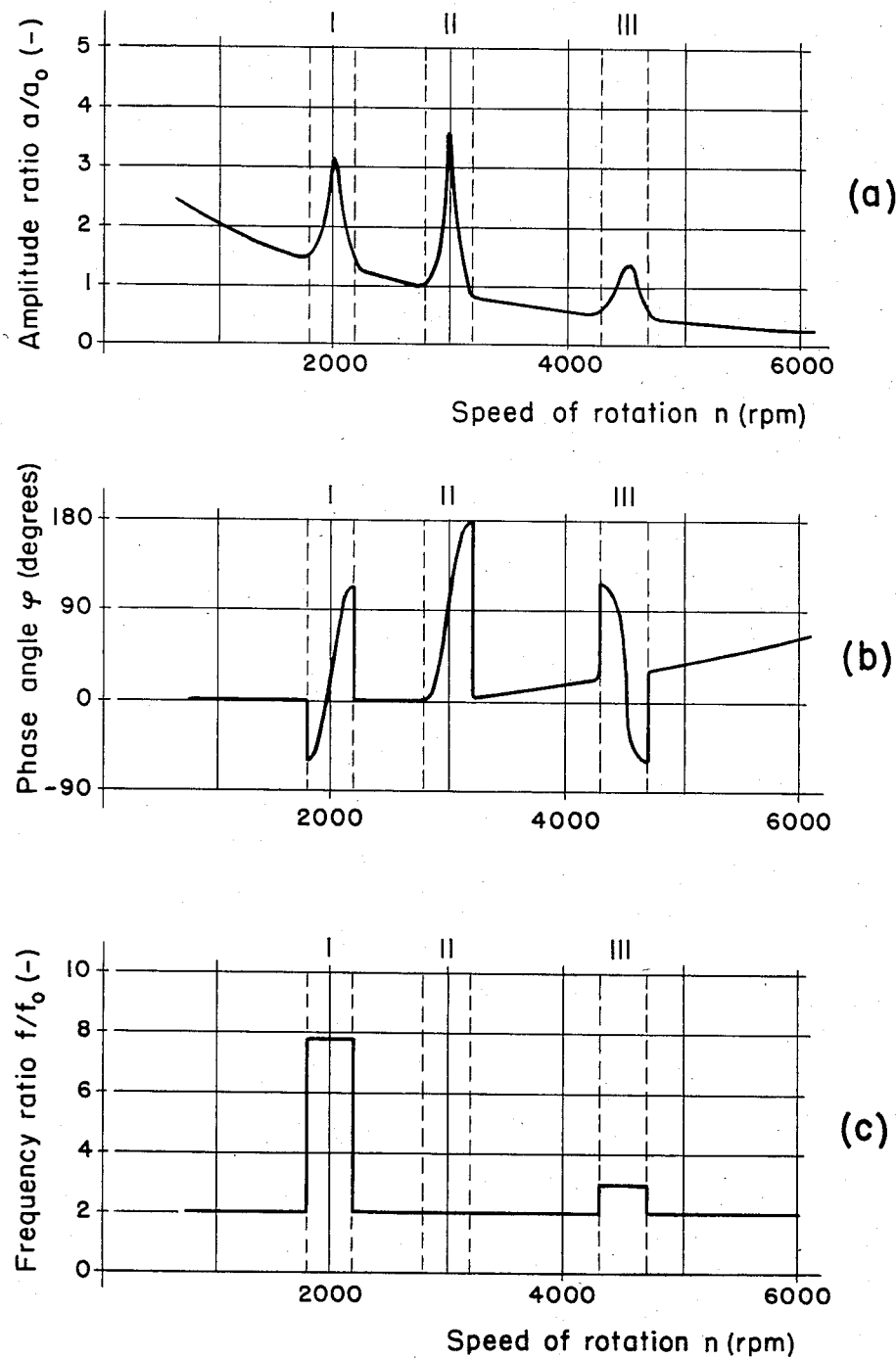
FIG. 1a plots amplitude ratio
FIG. 1b plots frequency ratio against speed of rotation.
FIG. 1c plots phase angle against speed of rotation.

The disturbing vibration referred to under (3) must be compensated in the speed range centered on 3000 rpm (Range II, 2800 to 3200 rpm.) It is excited by second-order forces at 3000 rpm at 100 Hz, comes to resonance and, magnified many times, is transmitted through the engine mount to the chassis. In this case, too, the excursion of the compensating baffle, and hence the controlled variable, must be increased. (FIG. 1a, range II.) The phase angle between control point and controlled variable is also about 180 degrees. However, no rapid phase change occurs at the lower speed limit of this range II since phase synchronism nearly exists between control point, controlled variable and second-order vibration, and since the natural frequency of the generator which is to be damped below resonance is approximately in phase with the exciting second-order vibration. In this range II, no change in frequency ratio occurs since the disturbing vibration and the exciting vibration have the same frequency.

Once the upper speed limit of this range II has been overshot, the control unit again changes over for the compensation of disturbing second-order vibrations.

In the case of the disturbing vibration referred to under (4), its maximum occurs at 4500 rpm ($225/3 \times 60$), and a speed range of from 4300 to 4700 rpm, for example, is therefore selected for compensation of this disturbing vibration. The frequency ratio changes from 2 to 3 since the disturbing vibration is a third-order vibration. (FIG. 1c.) The amplitude ratio, too, has the typical peaked configuration. In the phase response, a rapid phase change may occur at the beginning of the range here, too, but in this case in the positive direction. Since resonance exists also here, the phase angle within this range must again be about 180 degrees.

The amplitude, phase and frequency responses considered in this example as well as the limits of the ranges hold for a particular design of an engine mount in a particular motor vehicle, and the explanations have been limited, for the sake of simplicity, to a few critical operating conditions. In these cases, the invention provides optimum compensation of all disturbing vibrations which occur in normal use. With other motor vehicles, a different spectrum of disturbing vibrations may be present, depending on their design and equipment, and the positioning elements will have to be actuated in an appropriately different manner. The control unit will have to be programmed accordingly. No technical limitations are imposed on its discriminative reaction to disturbing vibrations.

Figure 5:
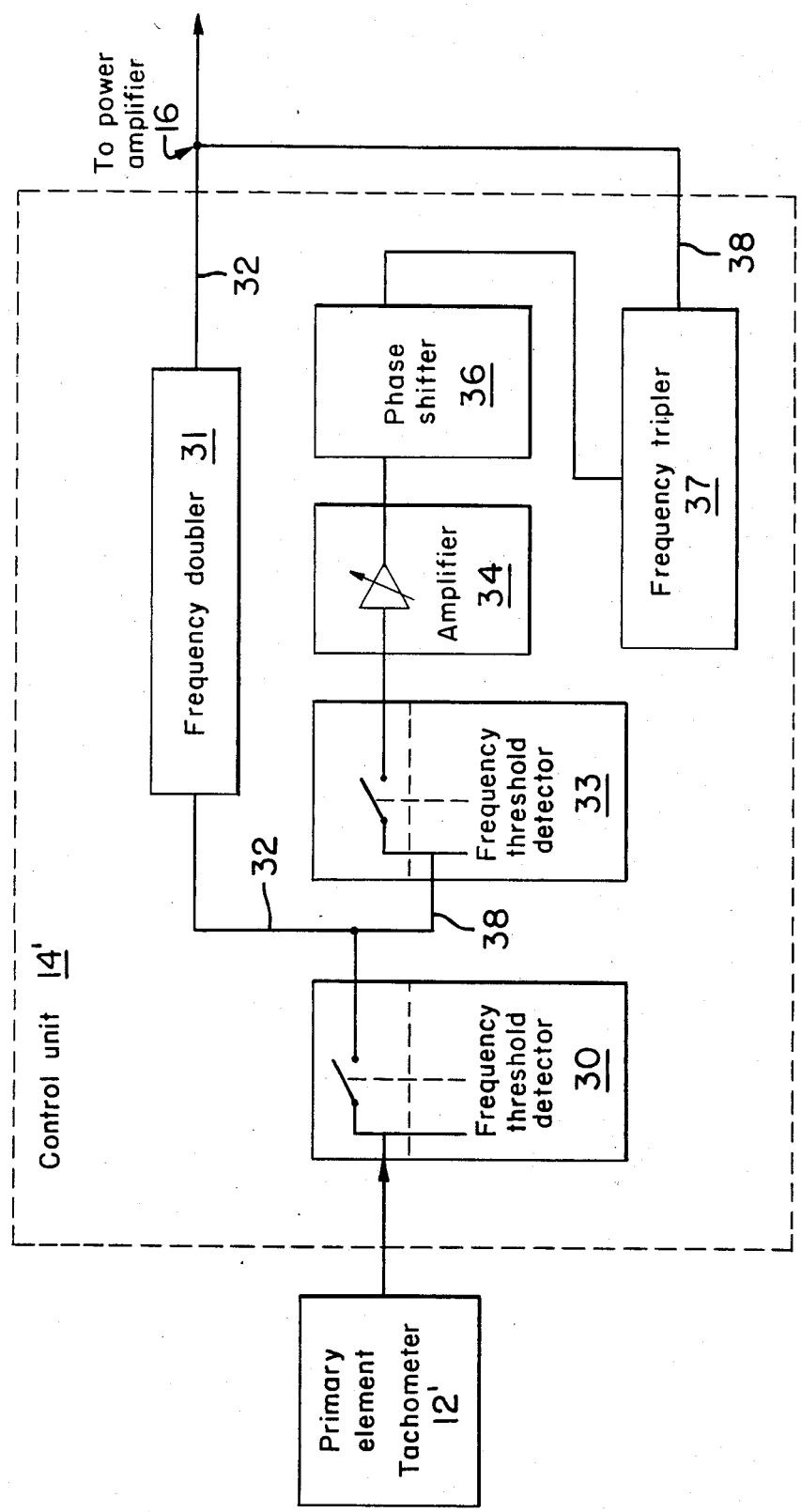
FIG. 5 is the computer control unit.

The control unit 14' of FIG. 5 is disclosed to illustrate the invention concretely in simplified form even though the control unit 14 in the form of the process computer previously described with reference to FIG. 2 is the best mode contemplated. For the embodiment of FIG. 5, it is assumed that it is empirically determined that, in use, the mount at 1 (FIG. 2) experiences large-amplitude vibrations below 25 Hz, two, first vibrations per engine revolution above 3000 rpm engine speed, and three, second vibrations per engine revolution above 3600 rpm engine speed for one or more of the reasons previously described, for example. In this embodiment, the primary element is a tachometer 12' producing one electric pulse per engine revolution with the same amplitude and phase as the first vibrations above 3000 rpm but twice the amplitude at a 90° phase shift from the second vibrations above 3600 rpm.

The control unit 14' therefore comprises a frequency threshold detector 30 connected to the primary element tachometer 12'. It blocks all tachometer pulses below 50 Hz (3000 rpm in engine speed) so that the compensating baffle 10 (FIG. 2) cannot respond thereto and passes, as by a switch therein, all tachometer pulses above 50 Hz (3000 rpm in engine speed). This allows the mount at 1 (FIG. 2) to damp elastically with thrust element 3 (FIG. 2) and hydraulically with nozzle 15 (FIG. 2) and bellows-bounded equalizing space 8 (FIG. 2) vibrations below 50 Hz and, particularly, the large-amplitude vibrations below 25 Hz in a manner known of itself from, for example, U.S. Pat. No. 2,535,080, except for its combination in the invention.

The tachometer pulses above 50 Hz passed by the frequency threshold detector 30 are provided to a frequency doubler 31 and then directly to the power amplifier 16 (FIG. 2) on line 32 because they are in amplitude and phase correspondence with the first vibrations from the engine above 50 Hz (3000 rpm engine speed) but half the frequency thereof. The power amplifier 16 then provides, as before, such amplification gain thereto as moves the compensating baffle 10 (FIG. 2) via the positioning element 11 (FIG. 2) opposite to the direction of the in-phase first vibrations and tachometer pulses by an amount sufficient to keep the liquid pressure in the working space 9 (FIG. 2) constant in spite of the first vibrations introduced into the mount. It is assumed, too, therefore, that there is negligible phase lag between the first vibrations and tachometer pulses in control unit 14' and movement of the compensating baffle 10 (FIG. 2) in response thereto. If, however, there were a frequency constant phase lag, for example, control unit 14' could include, in another embodiment (not shown), a phase shifter (not shown) in the line 32 between the frequency threshold detector 30 and the power amplifier 16 (FIG. 2), as contemplated for the control unit 14 (FIG. 2) and described above.

FIG. 5 also shows a second frequency threshold detector 33, an amplifier 34, a phase shifter 36, and a frequency tripler 37 in series in a line 38 in parallel with line 32 from the frequency threshold detector 30 to the power amplifier 16 (FIG. 2). The second frequency threshold detector blocks all tachometer pulses below 60 Hz (3600 rpm in engine speed) and passes those thereabove, i.e. those corresponding to the second vibrations. The amplifier 34 has an adjustable, i.e. programmable, gain which, for the assumed conditions described above, is adjusted (programmed) to 0.5. The phase shifter 36 shifts the phase of the amplified (halved) tachometer pulses $-90°$ (or $+270°$) into correspondence with the above-described phase difference between the second vibrations and tachometer pulses. Of course, the phase shift of the phase shifter could also be adjustable, i.e. programmable, in another embodiment (not shown) for further progammability of the control unit for operation on other vibrations. The frequency tripler 37 then triples the frequency of the amplified phase-shifted tachometer pulses for full correspondence with the second vibrations. Because of the threshold, amplitude, phase shift, and frequency change of the tachometer pulses, these pulses to the power amplifier 16 (FIG. 2) from line 38 have the same effect of maintaining constant pressure in working space 9 (FIG. 2) in spite of the second vibrations as previously described for the first vibrations.

The relationships of the tachometer pulses and first and second vibrations assumed to have been empirically determined with respect to FIG. 5 are, obviously, greatly simplified from the preceding example and, certainly, from the vibrations of a real engine/vehicle or other device on which the mount actually would be used. For this reason, the greater programmability of the first-described computer makes it the best mode for the control unit.

Nevertheless, the last example illustrates the invention and further instructs a programmer of ordinary skill how to apply the invention to the first example for an actual device on which the mount is to be used. The tachometer pulses thus constitute control points from which the amplitude and phase of pulses or other signals from the control unit are programmed or adjusted to cause pressure stability or compensation in the working chamber 9 (FIG. 2) to damp out the vibrations empirically found in the mount on the actual device.

It will be appreciated that the instant specification and claims are set forth by way of illustration and not of limitation, and that various changes and modifications may be made without departing from the spirit and scope of the present invention.

What is claimed is:

1. An apparatus for the resilient mounting of a vibrating body, said apparatus comprising a mounting bracket and a pedestal which are interconnected through a resilient element that contains a liquid-filled hollow space, a compensating baffle associated with a positioning element being provided whose adjustment permits compensation of the pressure variations in the liquid caused by disturbing vibrations, characterized in that the compensating baffle (10) bounds the working space (9) itself and covers at least 10 percent of the boundary surface of the working space; that the positioning element (11) is adapted to be actuated by a primary element (12) which detects disturbing vibrations of said body; and that the primary element and the positioning element are interconnected through a freely programmable control unit (14).

2. An apparatus according to claim 1, characterized in that the working space (9) is bounded by a hollow surface open in the direction of motion, and that the compensating baffle (10) extends from the opening of the hollow surface at right angles to the direction of motion.

3. An apparatus according to claim 1, characterized in that the positioning element (11) comprises an electric magnet coil.

4. An apparatus according to claim 3, characterized in that the positioning element comprises a return spring.

5. An apparatus according to claim 1, characterized in that the control unit (14) comprises a phase shifter and frequency multiplier.

6. An apparatus according to claim 1, characterized in that the control unit (14) comprises a frequency multiplier and amplitude multiplier.

7. An apparatus according to claim 1, characterized in that the control unit (14) comprises a phase shifter and amplitude multiplier.

8. An apparatus according to claim 1, characterized in that the control unit (14) comprises a phase shifter, frequency multiplier and amplitude multiplier.

9. An apparatus according to claim 1, and further characterized by an equalizing space (8) connected to the working space (9) through a throttle opening (15).

10. An apparatus according to claim 9, characterized in that the equalizing space (8) is bounded over at least a portion of its area by a wall of flexible material.

11. An apparatus according to claim 10, characterized in that said wall is a rolling diaphragm.

12. An apparatus according to claim 1, characterized in that the compensating baffle (10) is made of a pliable material and encloses a hollow chamber; that said hollow chamber is filled with a fluid medium; and that said medium can be pressurized by the positioning element (11).

13. An apparatus according to claim 12, characterized in that the compensating baffle (10) is in the form of a bubble and is disposed in the working space (9).

14. An apparatus according to claim 1, characterized in that said fluid medium consists of an incompressible liquid.

15. An apparatus according to claim 10, characterized in that said positioning element comprises an electric magnet coil.

* * * * *